Nov. 6, 1934.    E. A. DICKINSON    1,979,734
PETROLEUM REFINING APPARATUS
Filed March 6, 1929
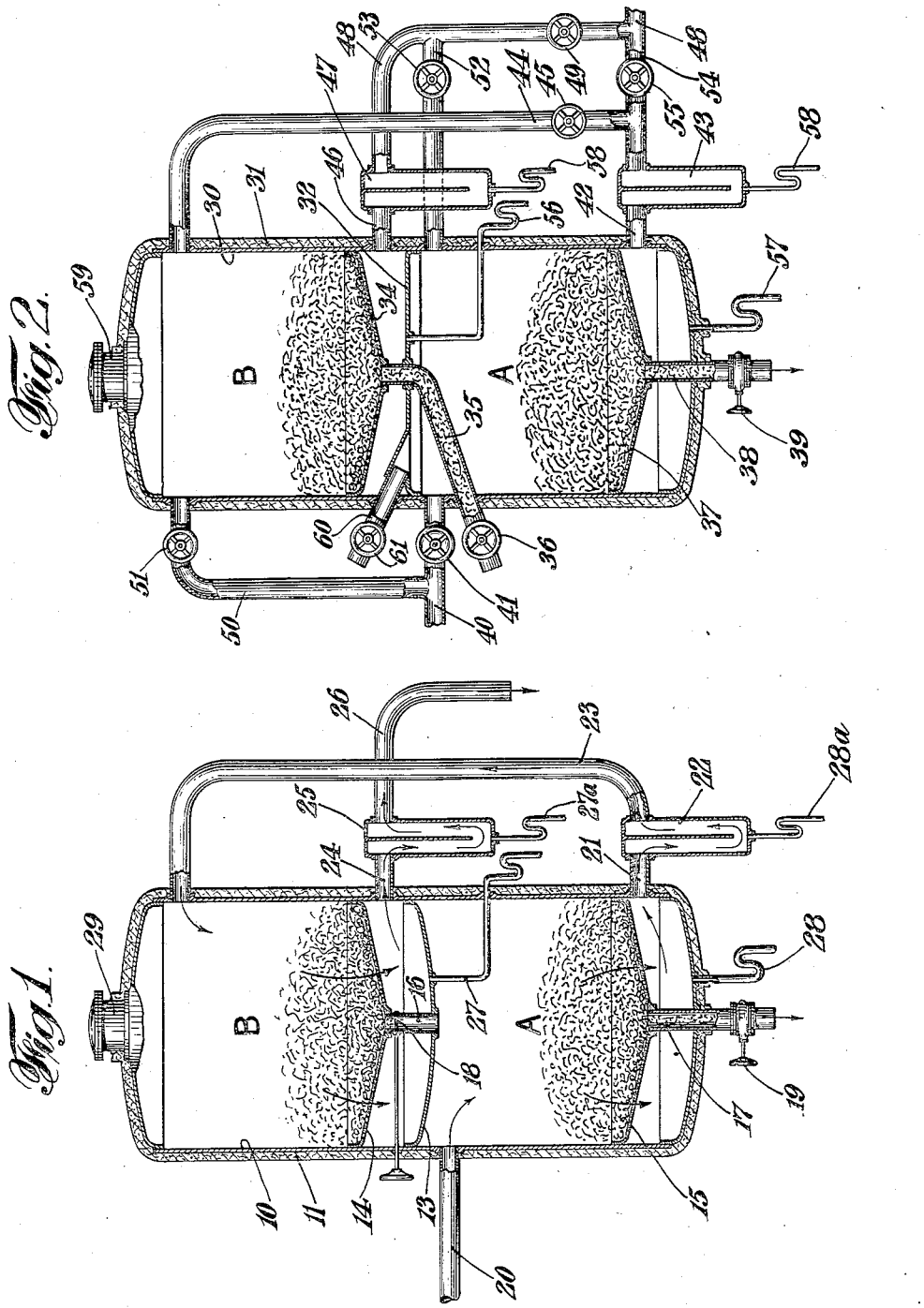

Patented Nov. 6, 1934

1,979,734

UNITED STATES PATENT OFFICE 1,979,734

PETROLEUM REFINING APPARATUS

Edwin A. Dickinson, East Orange, N. J., assignor to Gray Processes Corporation, Newark, N. J., a corporation of Delaware Application March 6, 1929, Serial No. 344,633

10 Claims. (Cl. 196—96)

This invention relates to petroleum refining and pertains especially to the purifying of cracked hydrocarbons by contacting the same in vapor phase with solid adsorptive treating material.

When cracked hydrocarbon vapors are passed through solid adsorptive treating material, the most common example of which in commercial use is fuller's earth, the unstable, unsaturated constitutents such as diolefins and the like present therein are polymerized into compounds of higher boiling points which compounds liquefy and are thereby separable from the vapor. This is taken advantage of in the refining process disclosed in U. S. Patent No. 1,340,889, and in various improvements of such process. In general these processes are practised by connecting a treating tower containing solid adsorptive treating material to a distillation system which may be a cracking, a re-running or a topping system, and the hydrocarbons to be treated are passed in vapor phase through the treating material until the latter is spent as evidenced by the lack of refinement of the treated vapor. Polymers formed in the process are separated from the treated vapors by virtue of their higher boiling point. It is preferable to pass the vapor downwardly through the catalyst, although upward treatment gives satisfactory results.

The co-pending application of T. T. Gray, Ser. No. 291,597 filed July 10, 1928, discloses and claims an improvement on the above process which results in a product of superior quality as regards freedom from gum forming constituents, color stability and the like, and also in a higher ratio of hydrocarbons treated to catalyst used. It also provides for more efficient separation of polymers from the treated vapors and more convenient means of continuous operation than hitherto have been available.

The present invention has for an object a treating apparatus for practicing efficiently the process above referred to.

A better understanding of the novel features of this invention will be facilitated by a description of the manner in which the catalyst becomes spent in the process as heretofore carried on, particularly where the vapors are passed downwardly through the treating material. It is apparent that in such process the least refined vapors come first in contact with the material near the top of the treating tower and successively lower layers are subjected to progressively more refined vapors. In this way, the upper strata of the treating material becomes spent before the lower ones. However, in actual operation it has been found that it is the lower layers and not the upper which first becomes so saturated with polymers as to prevent them having a beneficial effect on the vapors. Apparently this is caused by the wetting of the lower portions of the catalyst by polymers produced in the upper portion and carried down by the combined action of gravity and the vapor stream. Moreover, when the vapors are passed downwardly through the treating material they come in contact finally with the material most fully saturated with polymers and the difficulty of completely separating the treated vapor and polymers is increased and the quality of the treated vapor may actually be lessened by being passed through the bottom layers.

According to the present invention, the above noted undesirable features are eliminated by utilizing a plurality of beds of treating material instead of using, as heretofore, a single bed. The polymers formed in each bed or treating zone are removed from the vapor stream before the latter passes on to the next treating bed or zone. Polymers formed in one zone are thus prevented from wetting the treating material in successive zones and the effective life of the latter is materially increased; each treating bed or zone is maintained uncontaminated by polymers from the preceding stages. In addition, the vapor to be treated is passed through the beds in the inverse order of their activity.

Other objects, novel features and advantages of this invention will be apparent from the following specification and accompanying drawing wherein Fig. 1 is a section through a treating tower embodying the invention, and Fig. 2 is a similar section of a modified embodiment.

The treating tower 10 is cylindrical in shape and is provided with a covering 11 of heat insulating material. The tower 10 is divided into an upper chamber B and a lower chamber A, by the partition 13 above which is provided a funnel-like shelf 14 which is pervious to fluids, but inpervious to solids. A similar shelf 15 pervious to fluids but impervious to solids is arranged near the bottom of the tower. The shelf 14 terminates in a spout 16 which leads through the partition 13 while the shelf 15 terminates in a spout 17 which projects through the bottom wall of the tower. The spout 16 is controlled by a valve 18 while the spout 17 is controlled by a valve 19. A pipe 20 leads into the upper portion of the lower chamber A and a pipe 21 leads from below the shelf 15 to a separator 22 from which a pipe 23 leads to the upper portion of the upper chamber B. A pipe 24 leads from below the shelf 14 to a separator 25 from which a pipe 26 leads to a cooler, condenser or the like. A trapped pipe 27 is provided for draining liquid from the partition 13 and a similar trapped pipe 28 is provided for draining liquid from the bottom of the tower. A manhole 29 is provided in the top of the tower 10. Trapped pipes 27a and 28a are provided for draining the knockouts 22 and 25.

In the operation of the apparatus above described solid adsorptive catalytic material, such for example, as fuller's earth or the like is supported by the shelves 14 and 15, the material supported by the shelf 14 being fresher and more active than that supported by the shelf 15. Hydrocarbon vapor to be treated is led into the chamber A through the pipe 20 and passed through the catalytic material contained in such chamber. After passing through the catalytic material, the vapor escapes through the pipe 21 to the separator 22 in which entrained liquid is removed from the vapor. The vapor then passes up through the pipe 23 into the top of the compartment B. In this compartment the vapor again passes through a bed of catalytic material and then out through the pipe 24 to the separator 25 where entrained liquid is removed from the vapor. From thence the vapor passes to a suitable cooler or condenser. The vapor is thus first brought into contact with partially spent catalytic material and then into contact with more active catalytic material, thereby increasing the effective life of the treating material. After the catalytic material in chamber A has become spent the treatment is temporarily suspended and the spent catalytic material is drained from the shelf 15 through the spout 17, this being accomplished by opening the valve 19. The valve 19 is then closed and the valve 18 which up to this point has been closed is opened to permit the catalytic material in chamber B to drain through the spout 16 into chamber A. A charge of fresh solid adsorptive catalytic material is then introduced into the chamber B through the manhold 29 and operation of the apparatus is resumed with the vapor still passing through the less active material before it passes through the more active material.

Referring now to Fig. 2, 30 designates the treating tower which is provided with a covering 31 of heat insulating material, the tower being divided into upper and lower compartments B and A by a partition 32. Within the chamber B there is provided a funnel-like shelf 34 which is pervious to fluids but impervious to solids and which terminates in a spout 35 controlled by a valve 36 and leading to the exterior of the tower. Within the chamber A there is provided a funnel-like shelf 37 which is pervious to fluids but impervious to solids and which terminates in a spout 18 extending through the bottom of the treating tower and is controlled by the valve 39.

A pipe 40 controlled by valve 41 leads to the upper part of the chamber A and a pipe 42 leads from below the shelf 37 to a separator 43 from which a pipe 44 controlled by the valve 45 leads to the upper part of the compartment B. A pipe 46 leads from below the shelf 34 to a knockout 47 from which a pipe 48 controlled by a valve 49 leads to a cooler or condenser or the like. A pipe 50 leads from the pipe 40 to the upper part of the compartment B and is controlled by a valve 51. A pipe 52 controlled by the valve 53 leads from the pipe 48 to the upper part of the chamber A, and a pipe 54 controlled by the valve 55 connects the pipe 42 with the pipe 48. Trapped drain pipes 56 and 57 are provided for withdrawing liquid from the partition 32 and from the bottom of the tower 30 respectively, and trapped pipes 58 are provided for draining the separators 43 and 47. A manhole 59 is provided in the top of the compartment B and a charging conduit 60 controlled by a valve 61 is provided for the compartment A.

In the operation of this form of the apparatus, assume that the solid adsorptive material contained in the compartment A is less active than the solid adsorptive material in the compartment B. Under such circumstances the valves 51, 55 and 53 are closed while the valves 41, 45 and 49 are open. The vapor to be treated enters the upper part of the compartment A, passes through the solid adsorptive material contained therein, escapes through the pipe 42 to the separator 43 from whence it is conducted by the pipe 44 to the top of the compartment B. After having passed through the solid adsorptive catalytic material in the compartment B, the vapor is conducted by the pipe 46 to the separator 47 and from there through the pipe 48 to the cooler or condenser. After the treating material in the compartment A has become exhausted the operation is temporarily discontinued and such exhausted catalytic material is drained from the compartment A through the spout 38, this being accomplished by opening the valve 39. A charge of fresh treating material is introduced through the spout 60 after the valve 39 has been closed. The valve 61 is then closed and the valves 51, 53 and 55 opened while the valves 41, 45 and 49 are closed. The vapor to be treated then enters the top of the compartment B in which it passes through the partially spent treating material contained therein and escapes through the pipe 46 to the separator 47 from whence it passes by way of pipes 48 and 52 to the top of the compartment A. Here it comes in contact with the fresher catalytic material and after passing through the same escapes by pipe 42 to the separator 43 and from there through the pipe 55 to the pipe 48 beyond the valve 49 and thence to the cooler or condenser.

In each of the modifications above described, the vapor to be treated is brought into contact with a plurality of beds of treating material and between treatment the polymers formed in the catalytic material are removed from the vapors. Such polymers collect in the bottoms of the chambers and are removed through their respective drain pipes. In each instance the vapor to be treated is brought first into contact with partially spent catalytic material and then into contact with the more active catalytic material, thereby materially increasing the efficient life of the catalytic material.

It is, of course, within the scope of the invention that more than two said chambers be used, although the figure and description show the simplest embodiments, containing two chambers.

I claim:

1. In an apparatus of the character described a treating tower, a partition dividing said tower into superposed chambers, beds of solid adsorptive material supported for free drainage within said chambers, said beds being of different degrees of activity, means for withdrawing from each chamber liquid draining from the adsorptive material contained in such chamber, means for directing vapor downwardly through the beds of adsorptive material in the order of successively increasing activity, and means for discharging spent adsorptive material and introducing fresh catalytic material.

2. An apparatus of the character described comprising a tower, a partition dividing said tower into superposed chambers, a bed of catalytic material supported for free drainage in each chamber, means for removing from each chamber liquid drained from the catalytic material therein means for passing a vapor stream downwardly successively through said beds of catalytic material, means for removing a bed of spent catalytic material from the cycle of flow, means for introducing a fresh bed of catalytic material into said cycle, and means for directing vapors downwardly through the individual beds of catalytic material in the order of successively increasing activity.

3. In an apparatus of the character described, a tower, a partition dividing said tower into superposed chambers, fluid permeable shelves within each chamber, a bed of catalytic material supported by each shelf, means for passing vapor downwardly successively through said chambers and the treating material contained therein, means for withdrawing from each chamber liquid drained from the catalytic material therein, means for removing a spent bed of catalytic material from the cycle of flow, means for introducing a fresh bed of catalytic material into said cycle, and means for directing vapors downwardly through the individual beds in the order of successively increasing activity.

4. In an apparatus of the character described, a treating tower, a partition dividing said tower into superposed chambers, means for draining liquid from each of said chambers, a fluid permeable shelf in each chamber, a bed of catalytic material supported by each shelf, means for passing vapor downwardly successively through said chmbers and the treating material contained therein, means for removing a bed of spent catalytic material from the cycle of flow, means for introducing a bed of fresh catalytic material into said cycle, and means for directing the vapors downwardly through the individual beds in the order of successively increasing activity.

5. In an apparatus of the character described, a treating tower, an impermeable partition therein forming superposed treating chambers, a fluid permeable shelf in each of said treating chambers, a bed of solid adsorptive catalytic material supported by each shelf, means for draining liquid accumulating in each of said chambers, means for passing vapor successively downwardly through said chambers and the treating material contained therein, means for removing a bed of spent catalytic material from the cycle of flow, means for introducing a bed of fresh catalytic material into said cycle, and means for directing the vapor downwardly through the individual beds in the order of successively increasing activity.

6. In an apparatus of the character described, a tower, a partition dividing said tower into superposed chambers, beds of treating material supported within said chambers for free drainage, means for withdrawing from each chamber liquid drained from the treating material therein, and means for passing vapors downwardly through said chambers in any desired sequence.

7. An apparatus of the character described comprising a tower, a partition dividing said tower into superposed chambers, beds of treating material supported in said chambers for free drainage, means for passing vapor successively downwardly through said chambers and the treating material contained therein in any desired sequence, means intermediate said chambers for separating entrained liquids from the vapor, and means for withdrawing from each chamber liquid drained from the treating material therein.

8. In an apparatus of the character described a treating tower, a partition dividing said tower into superposed chambers, beds of solid adsorptive material supported for free drainage within said chambers, said beds being of different degrees of activity, means for withdrawing from each chamber liquid drainage from the adsorptive material contained in such chamber, means for directing vapor downwardly through the beds of adsorptive material in the order of successively increasing activity, means for discharging spent adsorptive material and introducing fresh adsorptive material, and means for transferring partially spent adsorptive material from one of said beds to another.

9. In an apparatus of the character described, a treating tower divided into communicating superposed chambers, beds of solid adsorptive material supported for free drainage within said chambers, means for withdrawing from each chamber liquid draining from the bed of adsorptive material located in such chamber, means for introducing fresh adsorptive material to the uppermost chamber and for discharging partially spent adsorptive material from a chamber into the chamber next below it, and means for passing vapors to be treated downwardly through one of said chambers and then downwardly through a chamber containing adsorptive material of greater freshness.

10. In an apparatus of the character described, a treating tower, partitioning means dividing said tower into superposed chambers, beds of solid adsorptive material supported for free drainage within said chambers, means for withdrawing from each of said chambers liquid draining from the bed of adsorptive material located therein, means for passing vapors downwardly through the lowermost chamber and then downwardly through a chamber lying above it, means for supplying fresh adsorptive material to the uppermost chamber, means for removing spent adsorbent material from the lowermost chamber, and valved conduit means in said partitioning means for discharging partly spent adsorbent material from the chamber lying above said partitioning means to the chamber lying below said partitioning means.

EDWIN A. DICKINSON.